United States Patent [19]

Phipps, Jr. et al.

[11] 3,712,368

[45] Jan. 23, 1973

[54] APPARATUS FOR MAKING DIRECTIONALLY SOLIDIFIED CASTINGS

[75] Inventors: Charles M. Phipps, Jr., Wapping, Conn.; Raymond R. Boucher, Tequesta, Fla.

[73] Assignee: United Aircraft Corporation, East Hartford, Conn.

[22] Filed: Dec. 1, 1971

[21] Appl. No.: 203,681

Related U.S. Application Data

[62] Division of Ser. No. 32,593, April 28, 1970, Pat. No. 3,667,533.

[52] U.S. Cl. .................................. 164/336, 164/361
[51] Int. Cl. ............................................. B22d 41/04
[58] Field of Search .......... 164/60, 80, 136, 335, 336, 164/361

[56] References Cited

UNITED STATES PATENTS

| 1,734,313 | 11/1929 | Von Malmborg | 164/336 |
| 1,926,573 | 9/1933 | Willcox | 164/336 X |
| 2,594,998 | 4/1952 | Rocco | 164/60 |
| 2,897,555 | 8/1959 | Nishikiori | 164/136 X |
| 3,538,981 | 11/1970 | Phipps | 164/80 X |

Primary Examiner—J. Spencer Overholser
Assistant Examiner—John E. Roethel
Attorney—Charles A. Warren

[57] ABSTRACT

A mold having a crucible portion connecting with the article forming portion is positioned within a tapering susceptor heated by a surrounding induction coil and the susceptor serves to control the temperature gradient during the solidification of the alloy in the mold. The crucible is located at the bottom of the assembly until the alloy is melted and the entire assemblage is then inverted to cause the molten alloy to flow into the article portion of the mold, the latter being preferably positioned on a chill plate.

4 Claims, 2 Drawing Figures

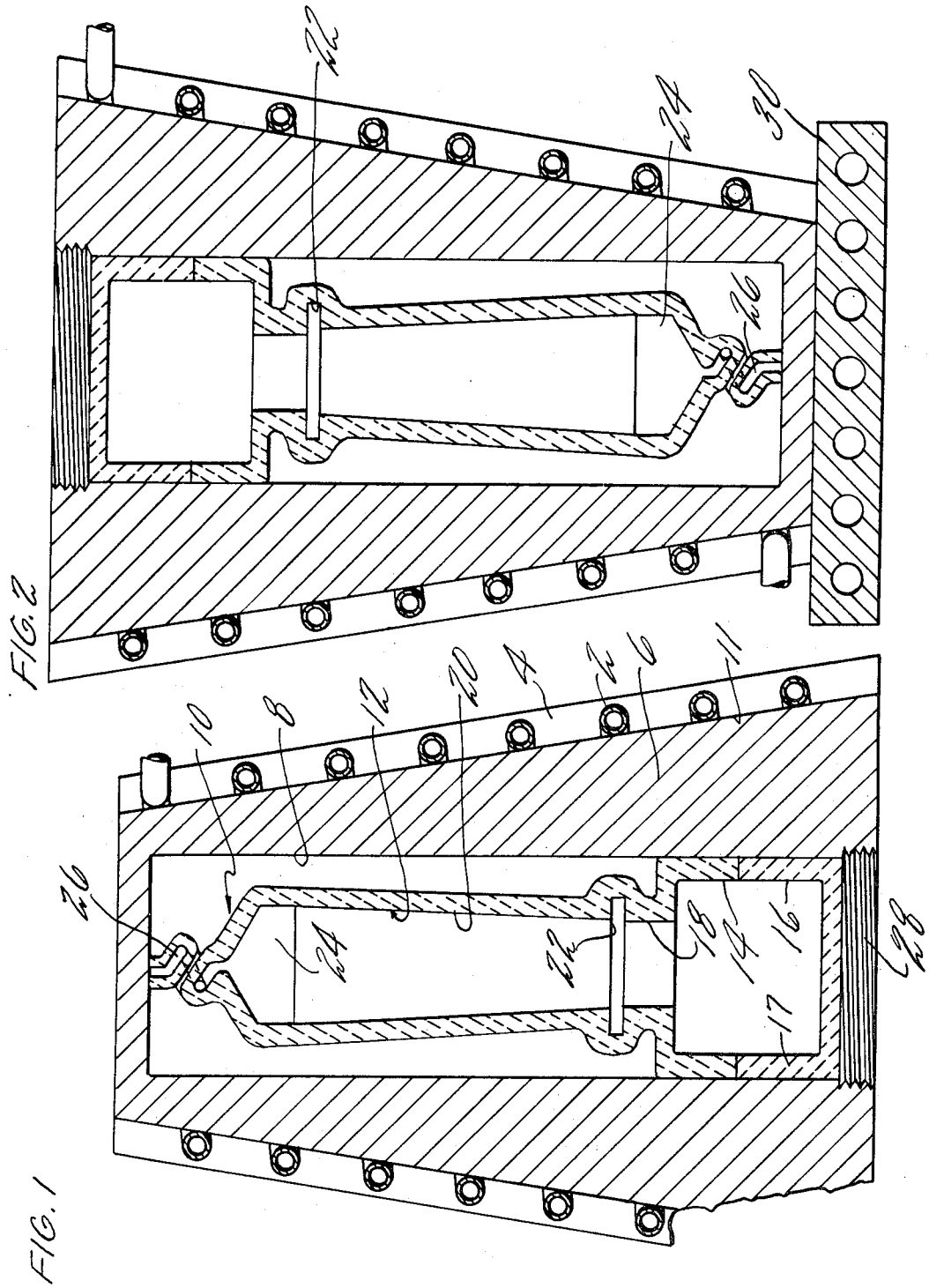

APPARATUS FOR MAKING DIRECTIONALLY SOLIDIFIED CASTINGS

This is a division of application Ser. No. 32,593, filed Apr. 28, 1970, now U.S. Pat. No. 3,667,533.

BACKGROUND OF THE INVENTION

Directionally solidified articles either columnar grained, as in VerSnyder patent, U.S. Pat. No. 3,260,505 or single crystal as in the Piearcey patent, U.S. Pat. No. 3,484,709, are cast in molds in which the temperature gradient during solidification is established by selectively controlling the power input to a plurality of heating coils axially spaced along the vertical axis of the mold, and the mold is heated to a temperature above the pouring temperature of the alloy in order that there will be no nucleation in the mold other than at the bottom of the mold. Heating the mold to this temperature necessitates a long period of heating and an alternate control of the heat input during the cooling operation in order to maintain the desired thermal gradient.

SUMMARY OF THE INVENTION

One feature of the invention is a susceptor surrounding the mold and varying in transverse dimension between the ends in order to control the rate of heat input to the mold during heating and the rate of cooling after the alloy is poured for maintaining the desired thermal gradient. Another feature is the arrangement of the susceptor so that the mold and susceptor may be inverted as a unit positioned on a chill plate for the solidification of the alloy. Another feature is the incorporation of a crucible portion within the mold so that the alloy may be melted during the heating of the mold with an inversion of the apparatus after the alloy is melted for filling the article forming portion and growth portion of the mold with the alloy.

According to the invention a susceptor, with a substantially cylindrical axially extending opening therein to receive the mold, has a varying wall thickness by which to control the rate of heat input to selected portions of the mold. The susceptor, the surrounding induction coil and the mold positioned within the susceptor are all inverted as a unit and positioned on a chill plate during solidification of the alloy. A crucible portion of the mold located at the bottom of the mold during heating of the mold and the alloy, is located at the top when the apparatus is inverted so that the melted alloy within the crucible portion flows into the article portion and growth zone in readiness for solidification.

BRIEF DESCRIPTION OF THE DRAWINGS

FIG. 1 is a vertical sectional view through the apparatus in a position for heating the mold.

FIG. 2 is a view similar to FIG. 1 with the apparatus inverted onto the chill plate.

DESCRIPTION OF THE PREFERRED EMBODIMENT

In the arrangement shown an induction coil 2 carried by suitable supporting element 4 surrounds a tapered susceptor 6, the latter having the smaller end located at the top. As shown, the susceptor has a cylindrical axially extending opening 8 therein to receive a shell mold 10 and the tapered wall thickness of the susceptor results from the outer wall 12 thereof being tapered. The surrounding induction coil tapers from end to end to conform to the outer surface of the susceptor.

The thin-shelled mold 10 which is positioned within the opening 8 and conforms to the shape of the article to be cast has an opening 12 therein forming the alloy receiving cavity of the mold in making the casting. At the bottom of the mold in FIG. 1 is the crucible portion 14 of the mold and this crucible portion receives a slug not shown of the alloy to be melted in making the casting.

This crucible portion has a separable cup 16 that is suitably cemented to the remainder of the mold after the wax pattern around which the mold is formed has been removed and the slug is in position.

Above the crucible portion is a passage 18 communicating with the article forming cavity 20 which in the arrangement shown represents a turbine blade having a shroud portion 22 at one end and a root portion 24 at the other. Above the root portion of the article forming cavity is a helical cavity in the mold which constitutes the growth zone 26 or crystal selecting zone of the mold. The use of a helical opening as shown for the selection of a single crystal is described in the copending application of Stephen M. Copley et al, U.S. Ser. No. 806,978 filed Mar. 13, 1969, now U.S. Pat. No. 3,625,275, assigned to the same assignee as this application, and is not a part of the present invention. The mold as a unit is retained within the susceptor by a threaded cap 28, which may be removed for access to the mold after casting is completed. When the cap is in position, the mold is held within the cavity in the susceptor with the end of the helical cavity 26 closed by the end wall of the susceptor remote from the cap.

With the apparatus in the position of FIG. 1, electrical energy is supplied to the induction coil thereby heating the susceptor 6 and raising the temperature of the mold positioned within the susceptor. As the mold is heated to a temperature above the melting temperature of the alloy, the slug of the alloy in cavity 14 is melted. The thicker wall of the susceptor in this area provides for greater heat input and less heat loss in this portion of the mold to provide the extra heat necessary for melting the alloy and to develop a thermal gradient in the mold.

When the alloy is completely melted and the mold is heated to the desired temperature, the apparatus is inverted to the position of FIG. 2 so that the top end of FIG. 1 is now at the bottom and is positioned on a chill plate 30. At this point, the supply of electrical energy to the induction coil is discontinued or reduced, (depending on the necessary growth rate) for the solidifying alloy. With the apparatus in the position of FIG. 2, the molten alloy flows into the article portion and growth zone of the mold to fill the mold to a point above that of the shroud 22. With the removal of heat from the bottom of the mold by the chill plate, crystallization of the alloy begins in the helix 26 and this helix serves to select a single crystal as the solidification reaches the root portion 24, with the fastest dendritic growth within the crystal in a vertical direction at a right angle to the chill plate. Growth continues in the form of a single crystal throughout the article portion of the mold. The desired thermal gradient which assures the growth or solidification in the form of a single crystal is controlled by the greater thickness of the susceptor toward the part of the apparatus which is now toward the top. In this way, the finished casting is a single crystal at least through the air foil part of the article portion.

Upon complete solidification the plug 28 is removed and the mold may be withdrawn from the susceptor and be replaced by a similar mold for a succeeding casting operation. The arrangement of this device permits the use of a single source of heat both for obtaining the desired temperature of the mold in readiness for pouring and also for melting the alloy in readiness for being poured into the article portion of the mold. It will be understood that the same device may be used for making columnar grained articles, as described in the above mentioned VerSnyder patent, by substituting for the helix of the mold shown, a growth zone as in the Sink et al. patent, U.S. Pat. No. 3,417,809. This growth zone may also be used in making single crystal castings to promote (100) grain orientation in the article rather than other grain orientations.

We claim:

1. Apparatus for casting directionally solidified articles including
    a mold having a two-piece crucible portion for the positioning of a charge therein, an article portion connected with one end to the crucible portion and a growth portion at the other end of the article portion
    a susceptor having a central cavity to receive the mold in a close fitting relationship, said susceptor having a tapering wall thickness around at least the growth portion of the mold to establish a temperature gradient in the mold
    an induction coil surrounding said susceptor for heating the latter and the mold to melt a charge in said crucible portion and
    a chill plate on which the mold and susceptor are positioned with the thinner end of the susceptor in contact with the chill plate and with the crucible at the top so that the melted charge will flow down into the article and growth portions and be solidified by the cooling effect of the chill plate.

2. Apparatus as in claim 1 in which
    the mold has a removable closure at the crucible end for insertion of a charge of alloy therein.

3. Apparatus as in claim 1 in which the central cavity of the susceptor is substantially cylindrical to receive the mold.

4. Apparatus as in claim 1 in which the tapered susceptor has its larger dimension surrounding the crucible end of the mold.

* * * * *